(12) United States Patent
Matsuo et al.

(10) Patent No.: US 7,966,390 B2
(45) Date of Patent: Jun. 21, 2011

(54) TERMINAL EMULATION PROGRAM, STORAGE MEDIUM, LOAD TEST METHOD, LOAD TEST APPARATUS, AND LOAD TEST SYSTEM

(75) Inventors: Koutarou Matsuo, Yokohama (JP); Masayuki Ito, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1136 days.

(21) Appl. No.: 10/898,359

(22) Filed: Jul. 26, 2004

(65) Prior Publication Data

US 2005/0228621 A1 Oct. 13, 2005

(30) Foreign Application Priority Data

Mar. 26, 2004 (JP) ................................. 2004-093812

(51) Int. Cl.
 *G06F 15/173* (2006.01)
(52) U.S. Cl. ......... 709/223; 709/224; 709/225; 709/226
(58) Field of Classification Search .................. 709/203, 709/223, 224, 225, 226, 229, 232; 702/182, 702/186
See application file for complete search history.

(56) References Cited

U.S. PATENT DOCUMENTS

| | | | | |
|---|---|---|---|---|
| 5,062,060 A * | 10/1991 | Kolnick | ........................ | 715/800 |
| 5,335,323 A * | 8/1994 | Kolnick | ........................ | 715/765 |
| 5,533,183 A * | 7/1996 | Henderson et al. | ........... | 715/854 |
| 5,596,702 A * | 1/1997 | Stucka et al. | .................. | 715/746 |
| 5,659,788 A * | 8/1997 | Someya et al. | ................. | 703/27 |
| 5,684,957 A * | 11/1997 | Kondo et al. | ..................... | 726/25 |
| 5,701,137 A * | 12/1997 | Kiernan et al. | ............... | 715/853 |
| 5,910,803 A * | 6/1999 | Grau et al. | .................... | 715/734 |
| 6,466,654 B1 * | 10/2002 | Cooper et al. | ............. | 379/88.01 |
| 6,473,794 B1 * | 10/2002 | Guheen et al. | ................ | 709/223 |
| 6,477,483 B1 * | 11/2002 | Scarlat et al. | ................. | 702/186 |
| 6,549,944 B1 * | 4/2003 | Weinberg et al. | ........... | 709/224 |
| 6,567,767 B1 * | 5/2003 | Mackey et al. | ............... | 702/186 |
| 6,694,288 B2 * | 2/2004 | Smocha et al. | ............... | 702/186 |
| 6,697,964 B1 * | 2/2004 | Dodrill et al. | ................... | 714/38 |
| 6,714,217 B2 * | 3/2004 | Huang et al. | .................. | 715/736 |
| 6,754,701 B1 * | 6/2004 | Kessner | ........................ | 709/219 |
| 6,799,213 B1 * | 9/2004 | Zhao et al. | ..................... | 709/224 |
| 6,985,940 B1 * | 1/2006 | Jenkin | ........................... | 709/224 |
| 7,047,446 B1 * | 5/2006 | Maurer et al. | .................. | 714/38 |
| 7,089,505 B2 * | 8/2006 | Nagahara et al. | ............. | 715/848 |
| 7,090,749 B2 * | 8/2006 | Flores et al. | .................... | 203/22 |
| 7,475,143 B2 * | 1/2009 | Hartmann et al. | ............ | 709/227 |
| 2002/0097268 A1 * | 7/2002 | Dunn et al. | ..................... | 345/760 |
| 2003/0023670 A1 * | 1/2003 | Walrath | ........................ | 709/203 |
| 2003/0036897 A1 * | 2/2003 | Flores et al. | .................... | 703/22 |
| 2003/0182408 A1 * | 9/2003 | Hu | ................................ | 709/223 |

\* cited by examiner

FOREIGN PATENT DOCUMENTS

JP 2001-28586 1/2001

*Primary Examiner* — Rupal D Dharia
*Assistant Examiner* — Edward J Kim
(74) *Attorney, Agent, or Firm* — Staas & Halsey LLP (57) ABSTRACT

A load test apparatus includes a computer which is implemented with an operating system having a window management function, and can be connected to a network device to be tested through an information network, and a terminal emulation program used to direct a computer to perform a first function for providing an execution environment in an MDI system of an application in a plurality of virtual terminals in a first window, and a second function capable of generating a plurality of second windows which cannot be discriminated by the window management function in the first window by managing independently from the operating system the second window generated in the first window. The terminal emulation program is executed by the computer to access to the network device from the plurality of virtual terminals, thereby conducting a load test.

5 Claims, 11 Drawing Sheets

WINDOW PROPERTY / 30

| MANAGEMENT TARGET DATA | DATA TYPE |
|---|---|
| VIRTUAL TERMINAL MANAGEMENT NUMBER | NUMERIC |
| WINDOW MANAGEMENT NUMBER 32 IN A VIRTUAL TERMINAL | NUMERIC |
| WINDOW NAME FOR INTERNAL MANAGEMENT | CHARACTER STRING |
| PARENT WINDOW POINTER FOR INTERNAL MANAGEMENT | REFERENCE TO OBJECT |

31 — VIRTUAL TERMINAL MANAGEMENT NUMBER
32 — WINDOW MANAGEMENT NUMBER 32 IN A VIRTUAL TERMINAL
33 — WINDOW NAME FOR INTERNAL MANAGEMENT
34 — PARENT WINDOW POINTER FOR INTERNAL MANAGEMENT

TERMINAL EMULATION PROGRAM, STORAGE MEDIUM, LOAD TEST METHOD, LOAD TEST APPARATUS, AND LOAD TEST SYSTEM

BACKGROUND OF THE INVENTION

1. Field of the Invention

The present invention relates to a terminal emulation program and an effective technology which can be applied to a load test of a network device based on the terminal emulation program.

2. Description of the Related Art

For example, when a load test is conducted on a network device such as a WWW (worldwide web) server, etc., it is impractical due to the restrictions on the materials, labor, cost, etc. that a number of client terminals and operation staff are arranged, and a number of HTTP requests are simultaneously generated by operating a browser.

Therefore, a method for measuring a load status of a server, a terminal, etc. in a network environment can be, for example, a load test tool as disclosed by the patent literature 1. That is, the patent literature 1 discloses a method of conducting a load test using a smaller number of test terminals by providing in a terminal having a personal computer, etc. a plurality of virtual terminals each of which has a different MAC address (physical address) and IP address (destination address), and controls the MAC address and the IP address of each virtual terminal.

However, since there cannot be a plurality of devices having the same physical addresses and destination addresses in a network, the physical addresses and the destination addresses of all terminals connected to the network are to be uniquely set, and the required search and setting operations are very difficult.

Furthermore, to avoid duplicate physical and destination addresses, other existing terminals can be removed from the network of the test environment. However, unlike the test in the environment different from the actual use environment, a result of a load test does not reflect the actual environment, thereby reducing the reliability.

As a common method, a terminal can open a plurality of browsers having an SDI (single document interface) screen in a single terminal so that the environment of using a plurality of terminals can be generated. In this case, the consumption of resource of the test terminal is considerably large, and it is almost impossible for a single terminal to generate the environment of a plurality of virtual terminals.

On the other hand, it is possible for a single terminal to open a plurality of browsers in the MDI (multiple document interface) system. However, since they are managed by one return value, etc., for example, only one window is opened when the two same windows are to be individually generated. Therefore, there occurs the problems that, for example, each browser cannot individually receive an error message, etc. from a server, etc.

[patent literature 1] Japanese Patent Application Laid-open No. 2001-28586

SUMMARY OF THE INVENTION

The present invention aims at providing a terminal emulation technology capable of realizing a plurality of virtual terminals without increasing the consumption of resources and without interfering with the independence of the display information about a generated window, etc.

The present invention also aims at providing a technology of conducting a load test on a high-reliable network device which reflects a practical use environment with less resources at a low cost without complicated preparing processes such as checking duplicate addresses, etc. in the information network.

The first aspect of the present invention is a signal carrying a terminal emulation program: operating in a computer in which an operating system having a window management function is implemented; and used to direct a computer to realize a first function for providing an execution environment in an MDI system of an application in a plurality of virtual terminals in a first window, and a second function capable of generating a plurality of second windows which cannot be discriminated by the window management function in the first window by managing independent of the operating system the second window generated in the first window.

The second aspect of the present invention is a computer-readable storage medium storing a terminal emulation program: operating in a computer in which an operating system having a window management function is implemented; and used to direct a computer to realize a first function for providing an execution environment in an MDI system of an application in a plurality of virtual terminals in a first window, and a second function capable of generating a plurality of second windows which cannot be discriminated by the window management function in the first window by managing independent of the operating system the second window generated in the first window.

The third aspect of the present invention is a load test method for generating a plurality of virtual terminals in a computer in which an operating system having a window management function is implemented, and conducting a load test on a network device to be tested by each of the virtual terminals accessing the network device through an information network. The load test method provides a step of preparing a terminal emulation program for directing a computer to realize a first function for providing an execution environment in an MDI system of an application in the plurality of virtual terminals in a first window, and a second function capable of generating the plurality of second windows which cannot be discriminated by the window management function in the first window by managing independent of the operating system the second window generated in the first window, and a step of conducting a load test on the network device by directing the computer to execute the terminal emulation program and accessing the network device from the plurality of virtual terminals.

The fourth aspect of the present invention is a load test apparatus including: a computer in which an operating system having a window management function is implemented and which is connected to a network device to be tested over an information network; and a terminal emulation program used to direct the computer to realize a first function for providing an execution environment in an MDI system of an application in the plurality of virtual terminals in a first window and a second function capable of generating the plurality of second windows which cannot be discriminated by the window management function in the first window by managing independent of the operating system the second window generated in the first window. The load test apparatus directs the computer to execute the terminal emulation program to access from the plurality of virtual terminals to the network device and conduct a load test on the network device.

The present invention can be realized under the environment of a commercial operating system (OS) for a personal computer having the window management function for displaying a window as an information display area on a display device. A hardware environment is in accordance with the operation environment of the commercial OS. In the present invention, a browser function which can be incorporated as a component into a part of the commercial OS for a personal computer and provides an access function to an information network such as the Internet, etc. can be used.

A simulation load measurement target of the load test method and apparatus using the terminal emulation program according to the present invention can be a WWW server, an application server, a network printer, etc. with any configuration.

Figure 1:
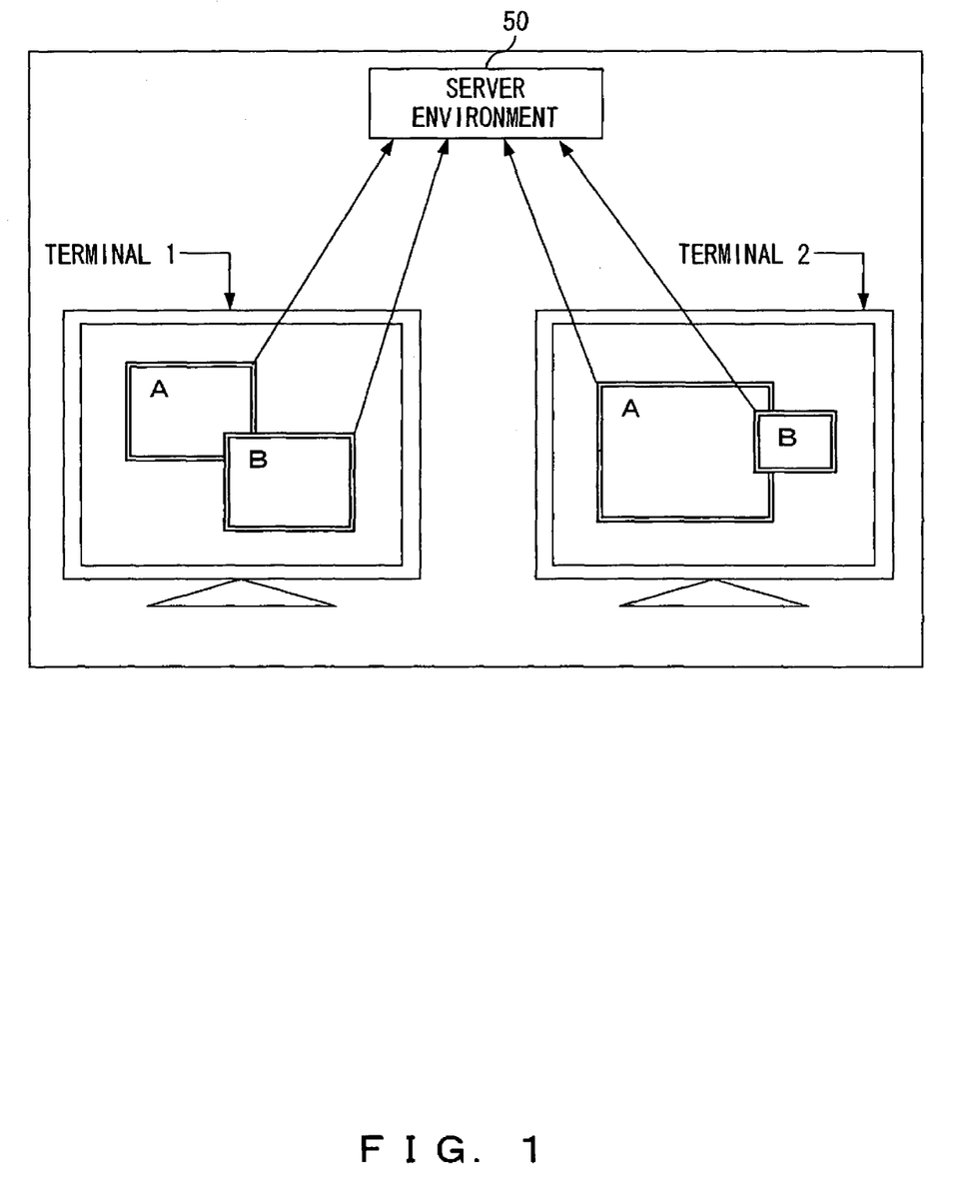
FIG. 1 shows the concept of requesting a WWW server by a user operating a browser using a plurality of terminals.

FIG. 1 shows the state in which a user operates a browser in a plurality of terminals such as a terminal 1 a terminal 2, etc., and issues a request to the WWW server. The browser is automatically assigned a window name for management normally by the OS. A and B shown in FIG. 1 indicate window names.

When a load is to be applied to a WWW server by issuing a large number of requests, it is normally necessary that a number of the independent terminals are prepared and a large number of users perform browser operations. However, it is generally difficult to prepare the above-mentioned test environment.

Figure 2:
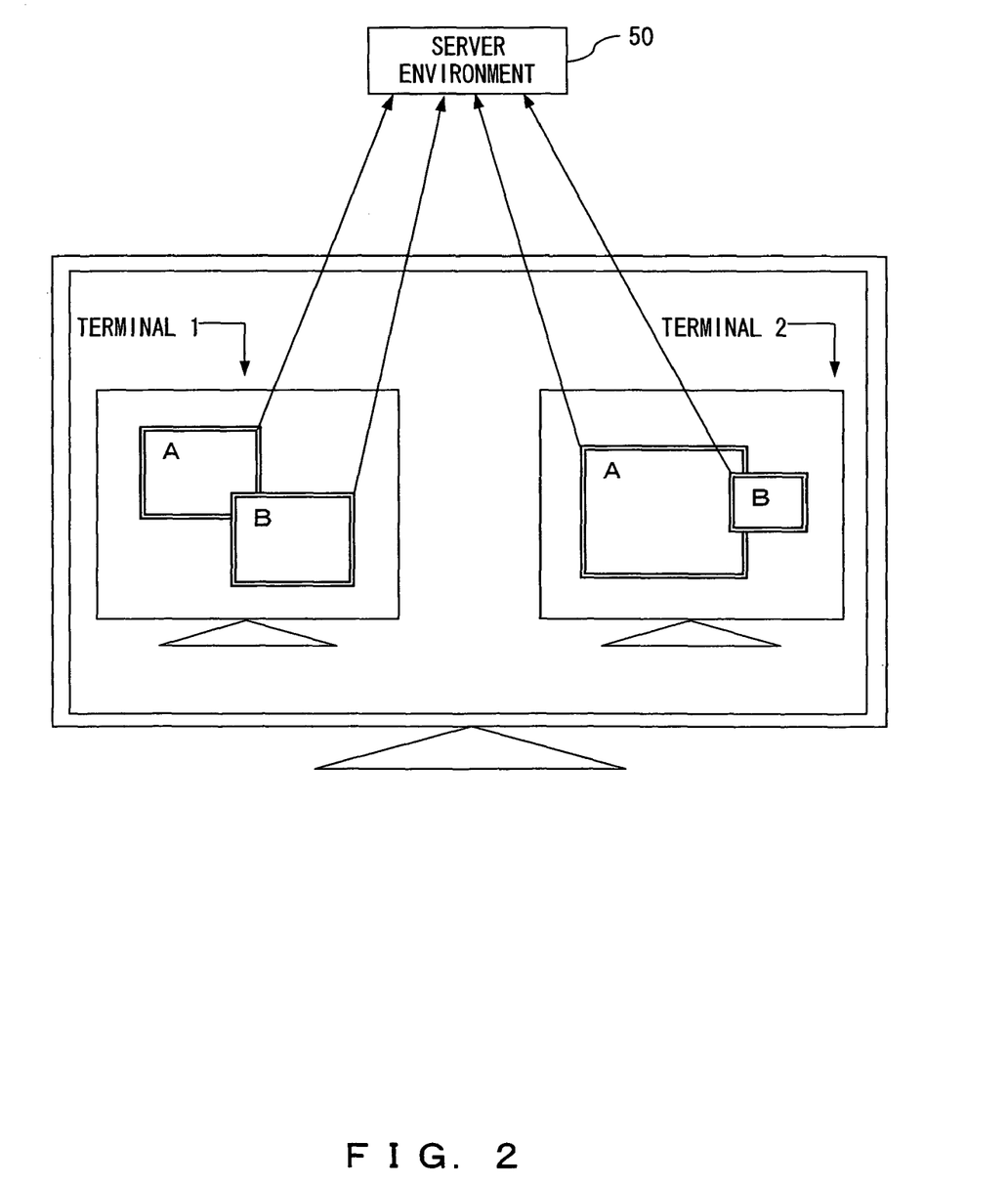
FIG. 2 shows the concept of simulating issues of requests by a number of users using a number of terminals by preparing a plurality of virtual terminals in a single terminal.

Therefore, as shown in FIG. 2, a simulation of issuing requests from a number of terminals and a number of users can be made by preparing a plurality of virtual terminals in one terminal. At this stage, a virtual terminal is only a concept, and does not practically exist in the system of the actual OS. Therefore, it is necessary to implement it in another program. The realization of the system of a virtual terminal is described later.

There are technical problems occurring in realizing the above-mentioned function. One is a technical problem of insufficient resources, and another is a technical problem in window name management. In the present invention, the two technical problems are solved as follows.

First, in the technical problem of insufficient resources, although a number of browsers are to be simultaneously opened in one terminal, the number of browsers to be simultaneously opened is normally limited to a small number due to the restrictions of the system resources, and a sufficient number of browsers cannot be opened.

Figure 3:
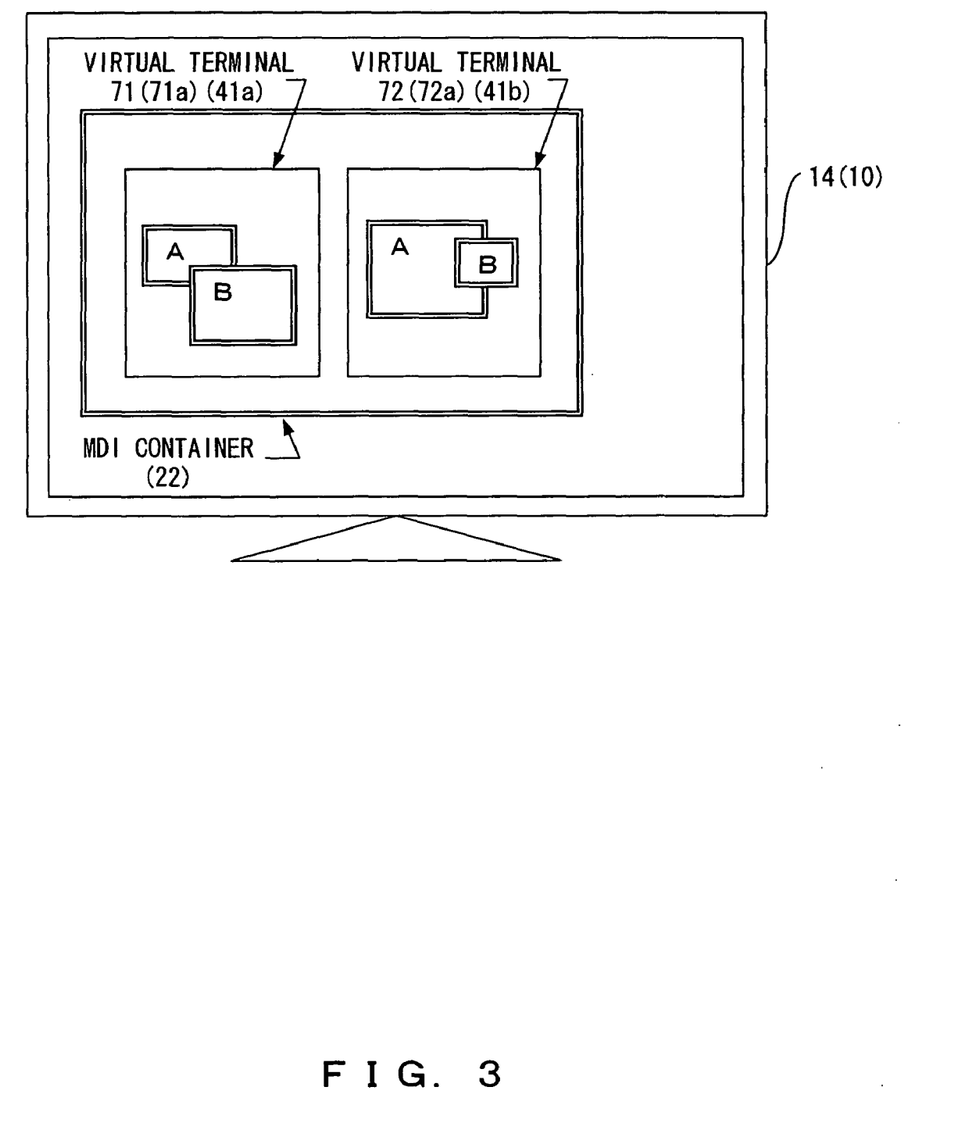
FIG. 3 shows the concept of virtual generation and window management by a terminal emulation program according to an embodiment of the present invention.

Then, according to the present invention, as shown in FIG. 3, an MDI container for providing the execution environment of the application software in the MDI system for displaying a plurality of document windows in a window of the application software executed in the OS is prepared as a second function, and a plurality of browsers are opened as child windows in the MDI container.

In the MDI container, the resources such as memory, etc. of a common portion of a plurality of browsers are shared in the MDI container. Therefore, a very large number of browsers can be opened. Thus, the technical problem of insufficient resources can be solved.

To solve the second technical problem of window name management, the present invention provides the system of virtual terminal management in the same terminal as a second function. That is, in FIG. 3, two browsers A and two browsers B are open. These browser windows are normally not discriminated by an operating system.

That is, A of a virtual terminal 71 and A of a virtual terminal 72 shown in FIG. 3 are not discriminated by the OS, but regarded as the same browsers. Therefore, the browsers having the same names as shown in FIG. 3 cannot be simultaneously opened.

First, it is necessary to perform window name management independent of the OS in the program. Normally, when the browser having the name A is opened by user input, the OS unique window name of A is first registered in the name management table, and then it is opened.

When a window is generated, the window generating process of the OS is canceled, and the second function opens a browser after registering the window name "A" in the unique name management table managed for each virtual terminal using a program. Since the name "A" is not registered in the name management table of the OS, the OS cannot recognize it. Thus, the management of a window name is disconnected from the OS.

That is, in the second function, each time a window is newly opened, the link relation to its parent is stored, and a process of maintaining a parent-child set for all opened windows can be performed by clarifying the transition of the windows.

Similarly when the browser having the name "A" is opened by user input from the virtual terminal 72, the browser can be opened after registering it in the unique name management table managed for each virtual terminal. Since names are not duplicated only in the name management table of the OS, duplicated names can exist in a window as shown in FIG. 3 unless the names are not registered in the name management table of the OS.

As described above, in the present invention, the second function acquires the name management function relating to the windows of the OS, and uniquely manages and controls the function, thereby generating and maintaining the windows having the same names among a plurality of browsers individually activated and a plurality of windows in the MDI container, thus possibly realizing a plurality of virtual terminals completely independent in the MDI container which refers to the first function.

As described above, according to the present invention, a plurality of browsers can be independently activated from a plurality of virtual terminals, and a load test can be conducted while displaying the status of the window actually in transition. For example, the information such as an error message, etc. can be browsed with the information individually displayed, thereby enabling the load test by regenerating the status of accessing a WWW server, etc. from a number of terminals.

DESCRIPTION OF THE PREFERRED EMBODIMENTS

The embodiments of the present invention are described below by referring to the attached drawings.

Figure 4:
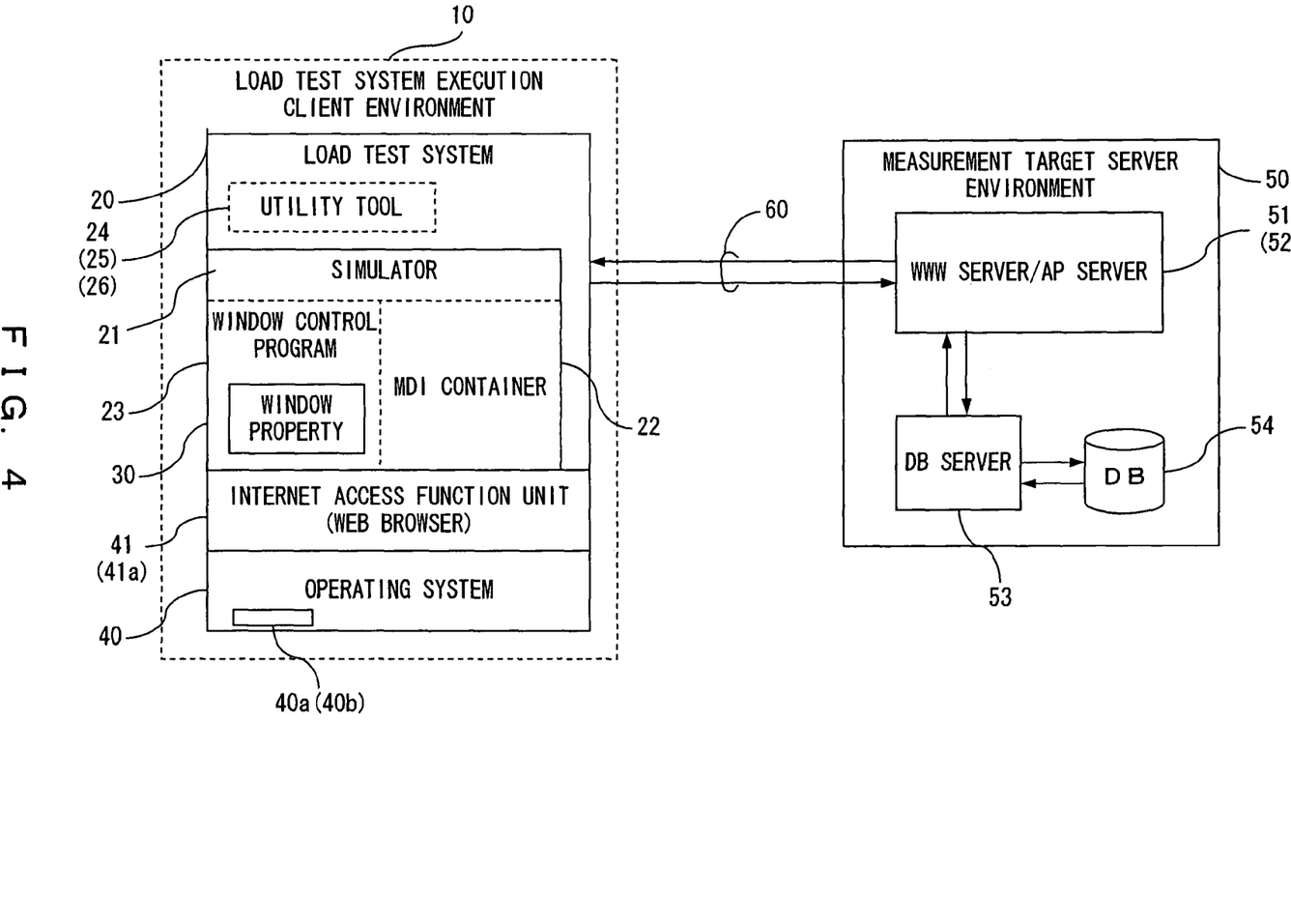
FIG. 4 shows the concept of a software configuration in the load test execution client environment in which a load test method is used using a terminal emulation program according to an embodiment of the present invention.
Figure 5:
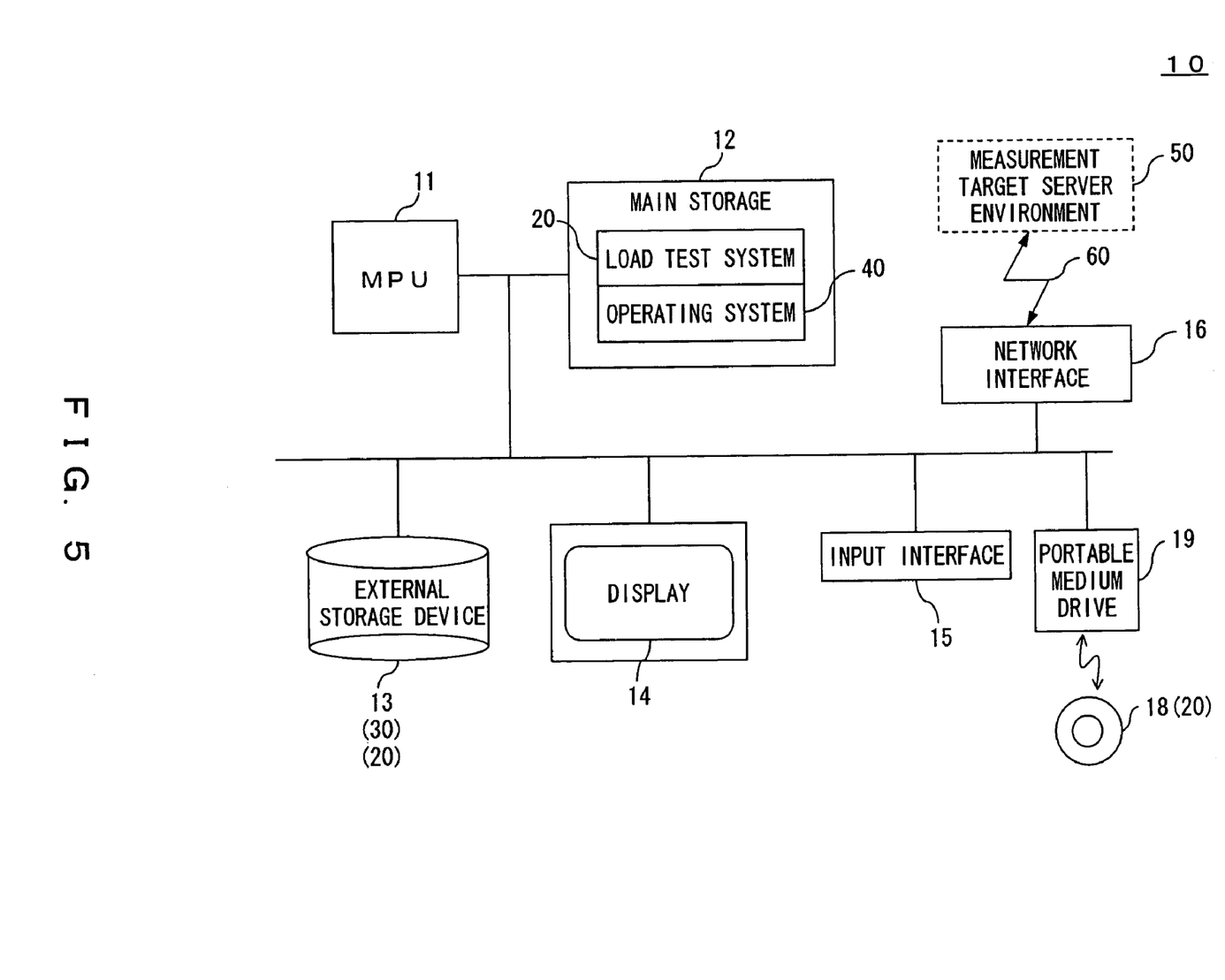
FIG. 5 is a block diagram showing an example of the hardware configuration of a load test execution client environment.

FIG. 4 shows the concept of a software configuration in the load test execution client environment in which a load test method is used using a terminal emulation program according to an embodiment of the present invention. FIG. 5 is a block diagram showing an example of the hardware configuration of a load test execution client environment.

As shown in FIG. 5, a load test execution client environment 10 according to the present embodiment comprises a microprocessor 11 and main storage 12 storing a program, data, etc. for control of the microprocessor 11. These components are connected to each of the components such as an external storage device 13, a display 14, an input interface 15 such as a keyboard, a mouse pointer, etc., a network interface 16, a portable medium drive 19, etc. via a bus 17. The load test execution client environment 10 with the above-mentioned configuration can be realized using an information processing device such as a personal computer, a work station, etc.

The main storage 12 is configured by a commercial OS, etc., and is implemented with an operating system 40 including an Internet access function 41 and a load test system 20 comprising programs operating in the operating system 40. The above-mentioned software is stored as nonvolatile software in the external storage device 13, and read to the main storage 12 and executed as necessary.

The operating system 40 generates a window which is a display area of information on the display 14, and comprises a window management function 40a for display of information in the window. Each window is discriminated by the window name assigned to the window. The window name is managed by a name table 40b.

The portable medium drive 19 can record/regenerate information on a portable storage medium 18 such as CD-ROM, a flexible disk, a DVD, semiconductor memory, etc.

The software configuring the load test system 20 according to the present embodiment is stored and distributed in the storage medium 18 as necessary. The storage medium 18 is inserted into the portable medium drive 19 to read the load test system 20 so that it can be transferred to the external storage device 13 for implementation.

The software such as the load test system 20, etc. according to the present embodiment can also be implemented in the external storage device 13 from an external server device, etc. through the network interface 16 and an information network 60.

The load test execution client environment 10 is connected to a measurement target server environment 50 (network device) from the network interface 16 through the information network 60 such as the Internet, etc.

According to the present embodiment, as shown in FIG. 4, the load test system 20 is configured by an MDI container 22 (first function) and a window control program 23 (second function), and comprises a simulator 21 for generating a plurality of virtual terminals for a load test in the external measurement target server environment 50.

The MDI container 22 provides an execution environment capable of displaying a plurality of document windows corresponding to the respective unit information requests such as a document file, etc. accessed by the application program in one window of the application program activated in the MDI container 22.

That is, at an activation request of an application program, the MDI container 22 determines whether or not the application program has been activated. If it has been activated, a window for display of information resources such as a file, etc. which can be a trigger of the activation request, and the window control program 23 related to the window are generated, and controls the window, etc. to be shared by activated application programs.

Thus, when application programs of a plurality of WEB browsers 41a, etc. are activated by the respective virtual terminals generated in the MDI container 22 as described later, the entity of the WEB browser 41a is singular, and a window is generated corresponding to unit information resources such as a home page, a document file, etc. to be accessed. Therefore, the memory area occupied in the main storage 12 by the body of the WEB browser 41a can be a sum of the capacity required to activate one WEB browser 41a and the capacity required in management of a plurality of document windows. The sum of the capacities is a value much smaller than a value required when the WEB browser 41a is individually activated for each of a plurality of document files.

The window control program 23 has the function of performing the window generating process in the MDI container 22 independent of the window management function 40a of the operating system 40, accessing a window property 30 storing as a table the information for window management, etc., and managing a window generated in the MDI container 22 independent of the window management function 40a of the operating system 40.

That is, the window control program 23 is generated in association with each window generated in the MDI container 22, and manages a window in the MDI container 22 by performing the process of a window generating process 200, preprocess 300 for navigation, etc.

Figure 6:
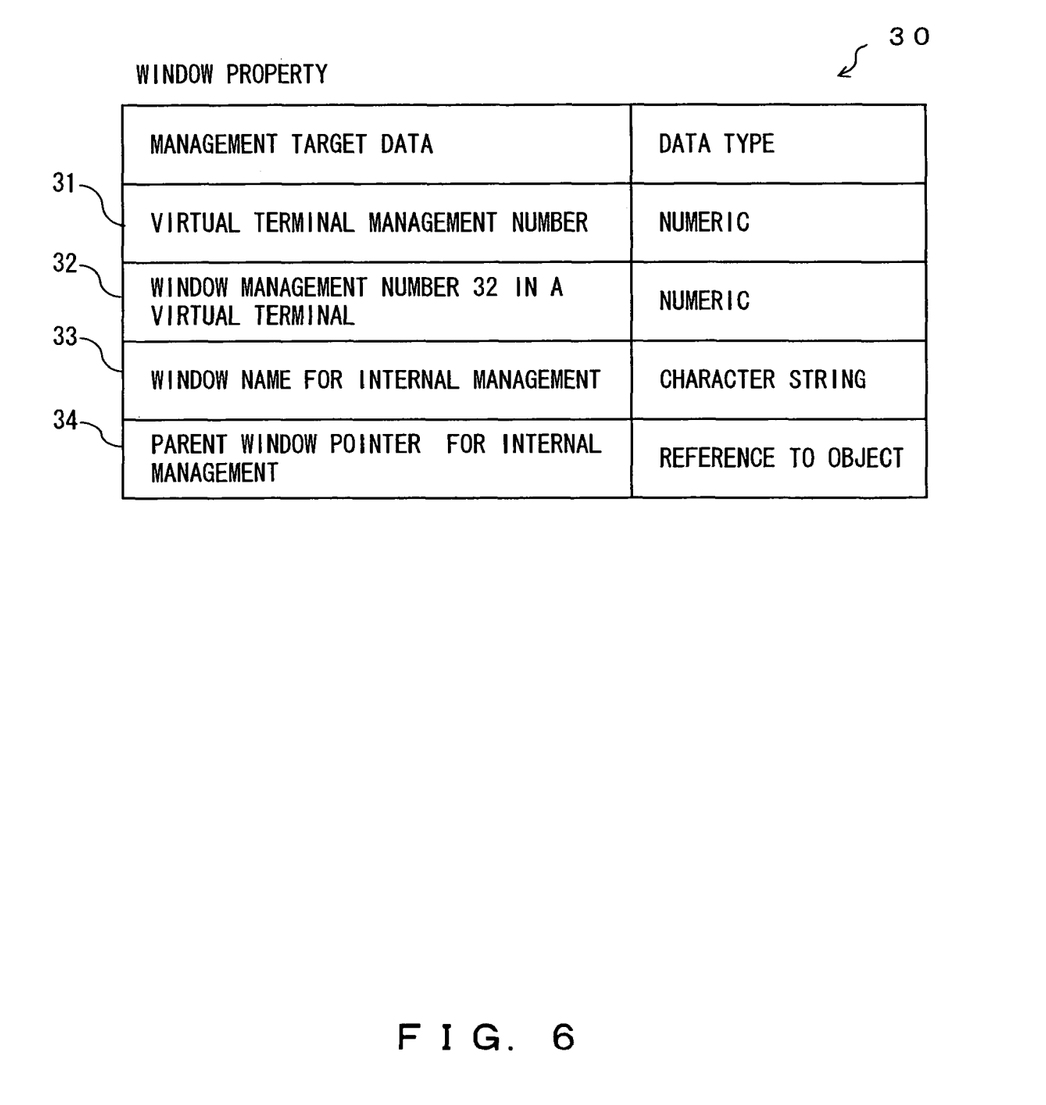
FIG. 6 shows the concept of window management information used in a terminal emulation program according to an embodiment of the present invention.

As shown in FIG. 6, the window property 30 stores, for example, information associated with each window in the MDI container 22.

That is, the window property 30 stores as a table: a virtual terminal management number 31 for identification of the window as to which it belongs in a plurality of virtual terminals generated by the MDI container 22; a window management number 32 in a virtual terminal for management of the window in each virtual terminal; a window name 33 for internal management storing the name of the window for management of a window independent of the operating system 40; and a parent window pointer 34 for internal management indicating from which window the window has been opened. The attribute of each information is as shown on the right in FIG. 6.

The load test system 20 can comprise as necessary a utility tool such as a tracer 24, an editor 25, an analyzer 26, etc. for support of a load test by the simulator 21.

The tracer 24 has the function of recording on an operation log 24*a* the operation status of a user 80 in the actual access to the measurement target server environment 50 by the WEB browser 41*a* provided by the Internet access function 41 of the operating system 40.

The editor 25 is used in acquiring an operation log 24*b* by editing the operation log 24*a*. The operation log 24*b* is read by the simulator 21 as necessary, and is used in regenerating the status of concurrent access to the measurement target server environment 50 by the WEB browser 41*a* activated in a plurality of virtual terminals described later.

The analyzer 26 has the function of analyzing a load test result on performance data 26*a*, etc. output from the simulator 21, visualizing it, and providing the result for the user 80.

On the other hand, as shown in FIG. 4, the measurement target server environment 50, which is a target of the load test by the load test execution client environment 10, comprises a WWW server 51, an application server 52 for providing a database service, etc. for access to a database 54 in cooperation with a database server 53, a database 54 accessed by the database server 53, etc. It is then connected to the load test execution client environment 10 through the information network 60 such as the Internet, etc.

Figure 7:
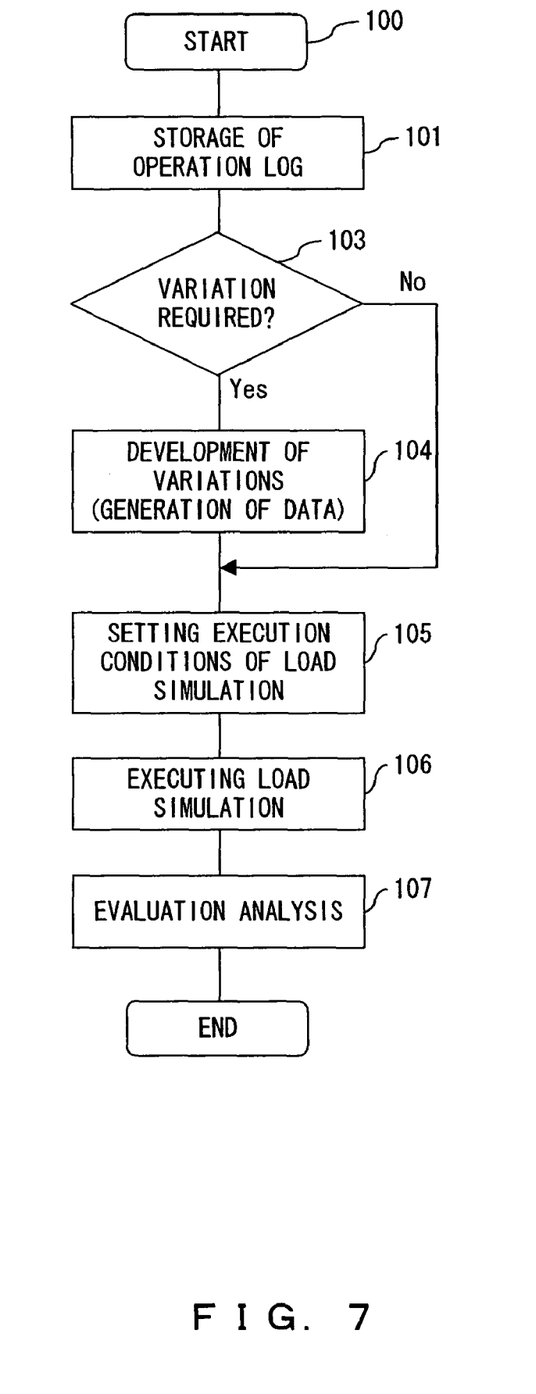
FIG. 7 is a flowchart showing an example of the entire process of the load test system according to an embodiment of the present invention.
Figure 8:
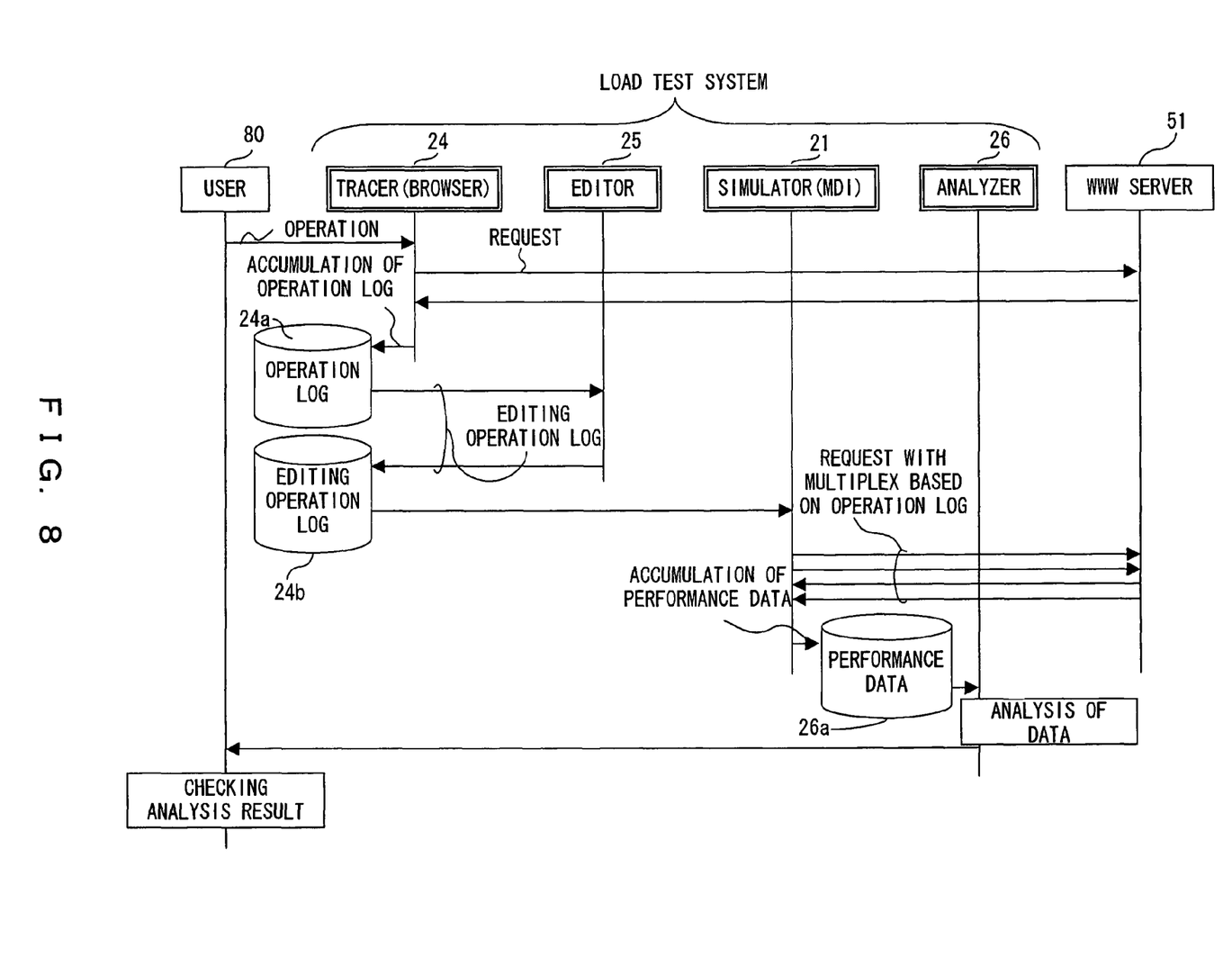
FIG. 8 is a flowchart showing an example of the entire process of the load test system according to an embodiment of the present invention.
Figure 9:
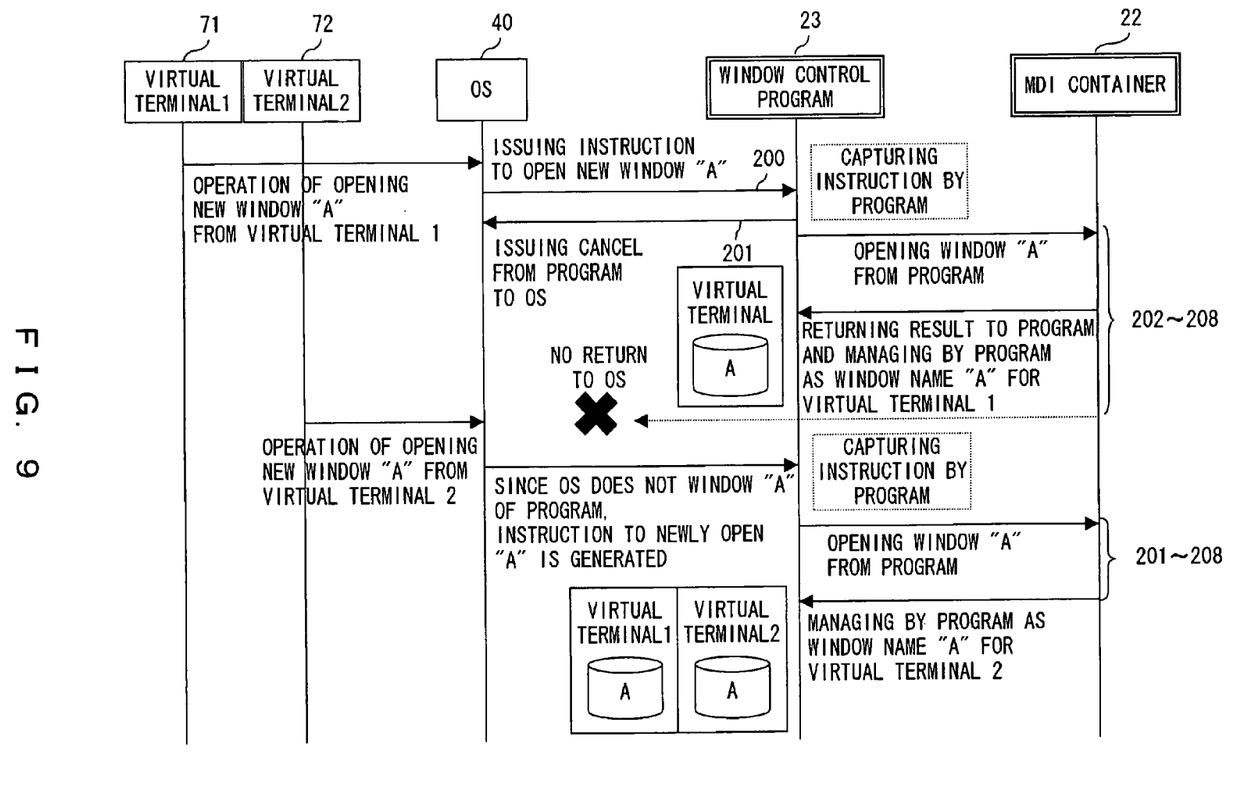
FIG. 9 is a flowchart showing an example of the window generating process using a terminal emulation program according to an embodiment of the present invention.
Figure 10:
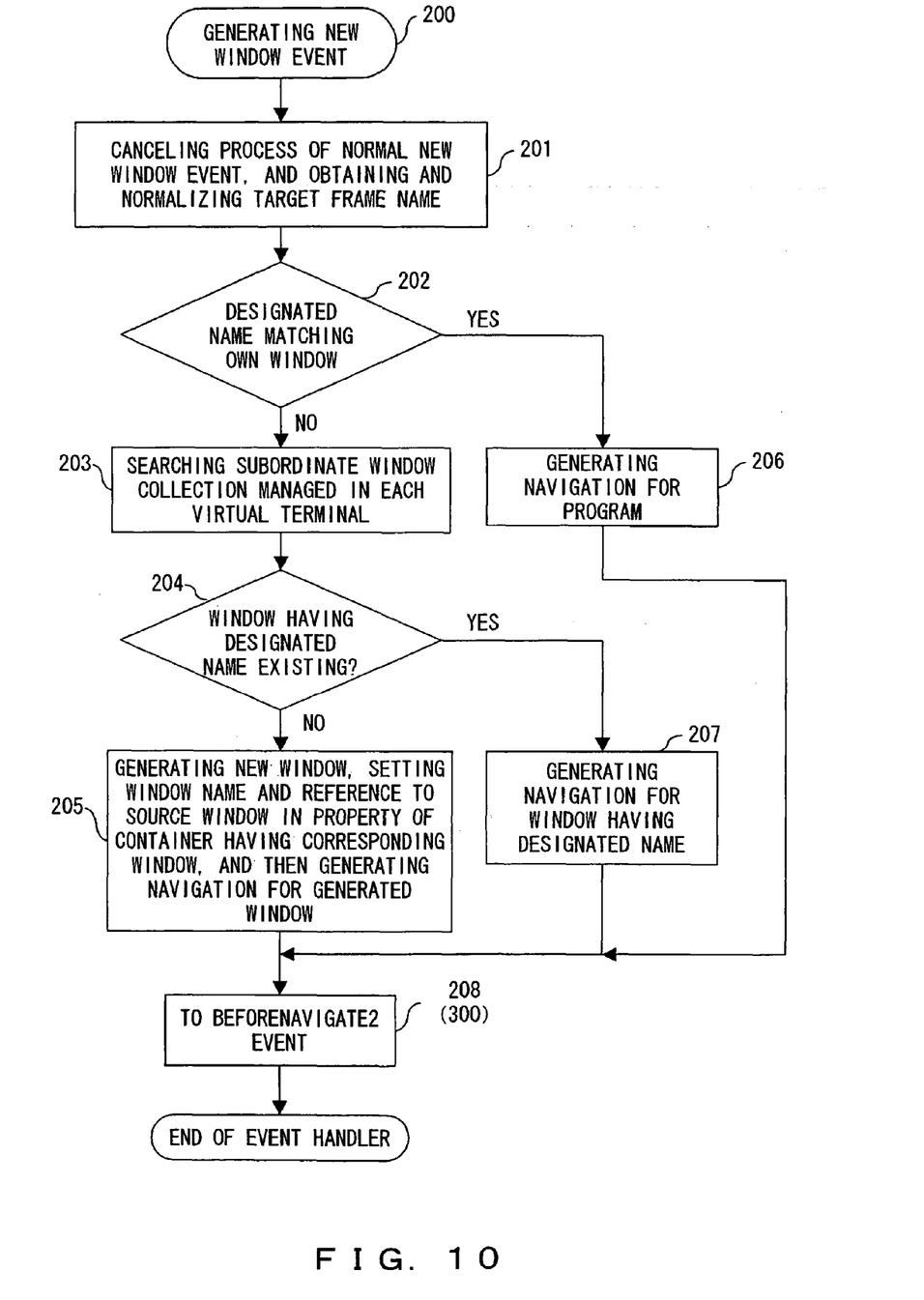
FIG. 10 is a flowchart showing an example of the window generating process using a terminal emulation program according to an embodiment of the present invention.
Figure 11:
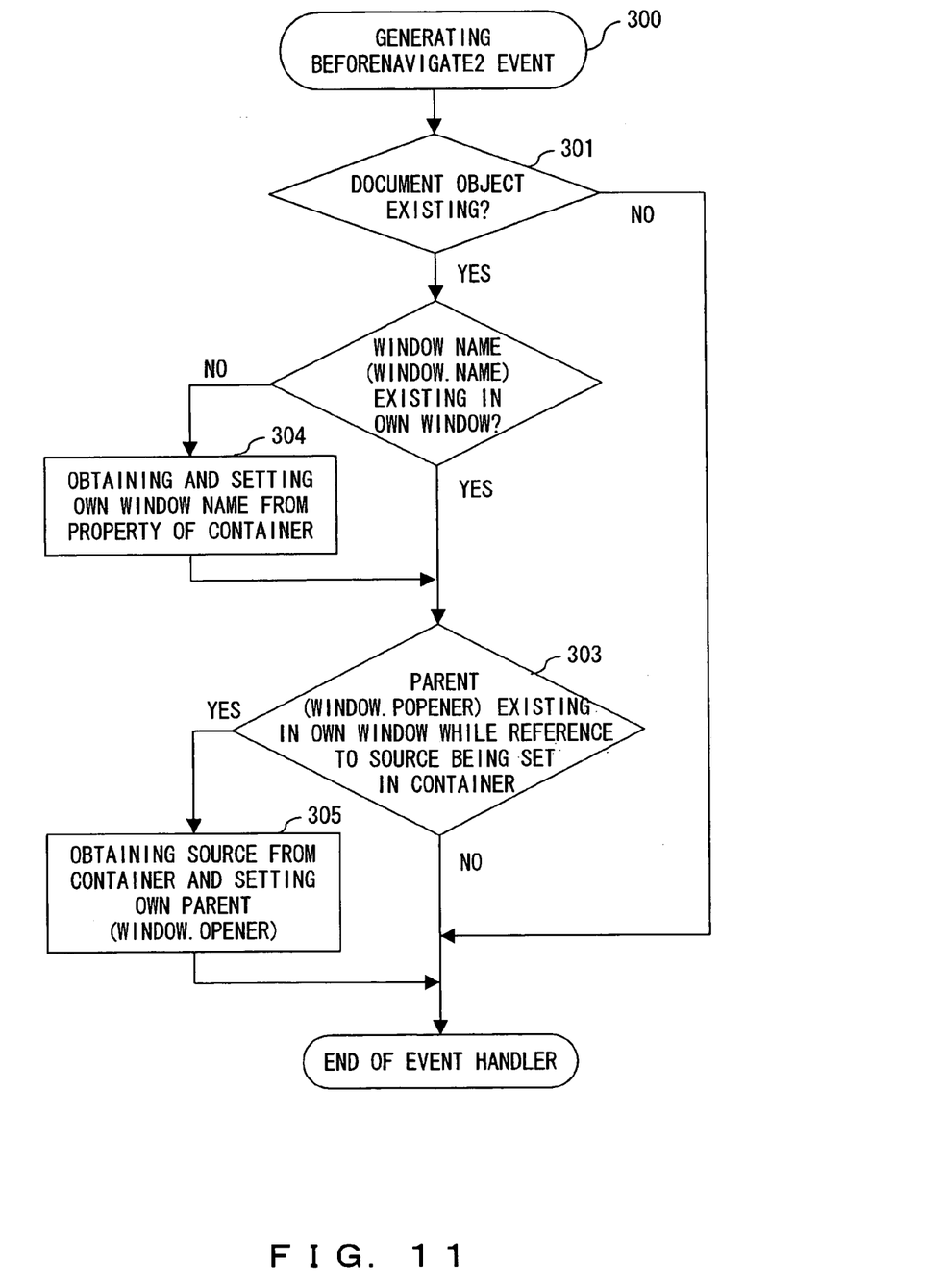
FIG. 11 is a flowchart showing an example of the window generating process using a terminal emulation program according to an embodiment of the present invention.

An example of the operation according to the present embodiment is explained below. FIGS. 7 and 8 are flowcharts showing examples of the entire process of the load test system according to the present embodiment. FIGS. 9, 10, and 11 are flowcharts showing examples of the window generating process by the MDI container 22 and the window control program 23.

As shown in FIGS. 7 and 8, the tracer 24 first accesses the measurement target server environment 50, and the screen transition information by the operation of the user 80, the input contents of the form, the operation history of the button operation, etc. is automatically recorded in the operation log 24*a* (step 101).

At this time, as necessary (step 103), the operation log 24*a* can be edited or developed in variation, etc. using the editor 25. That is, the simulation data can be variable in a virtual terminal (user) unit. For example, the input data of each ID and password can be set in a virtual user (virtual terminal) unit (step 104).

Then, the execution condition (for example, the operation log name, the number of virtual users (virtual terminals), the execution frequency, considering time, the synchronous process, etc.) of the load simulation is set (step 105). Depending on the execution condition, as shown in FIG. 3, a plurality of virtual terminal 71*s*, a plurality of terminal windows 71*a* for the virtual terminal 72, and a terminal window 72*a* (first window) are generated in the MDI container 22, a virtual user is assigned to each virtual terminal, the WEB browser 41*a* is activated, and the WWW server 51 and the application server 52 in the measurement target server environment 50 are simultaneously accessed to apply a process load (step 106).

When the plurality of virtual terminals are generated, the WEB browser 41*a* activated by each of the virtual terminal 71 and the virtual terminal 72 is activated in the MDI system in the MDI container 22. That is, in the MDI container 22, although a plurality of WEB browsers 41*a* are activated, the number of browser bodies is one, and a different window is generated for each unit information resource of a home page, a document data, etc. to be accessed. Therefore, since the resources, etc. such as the occupied memory, etc. of the common browser portion can be shared among the WEB browsers 41*a*, the memory capacity of the main storage 12 in which the load test system 20 is implemented does not become insufficient although the number of virtual terminals and the number of activated browsers increase.

In the MDI container 22, as shown by the flowcharts shown in FIGS. 9, 10, and 11, the generation management of a window is performed independent of the window management function 40*a* of the operating system 40. Therefore, the window displaying an error message, etc. returned from the WWW server 51 is individually generated although they are the same among the WEB browsers 41*a*, and the information communicated with the WWW server 51 can be individually displayed for each virtual terminal independently for each virtual terminal.

Thus, as shown in FIG. 3, the windows A and B (second window) having the same names can be displayed together on each of the virtual terminals 71 and 72, and each of the virtual terminals 71 and 72 activates the WEB browser 41*a* at the actual terminal, and the access status recognized at the accessing process to the measurement target server environment 50 can be regenerated.

That is, FIG. 9 shows the process of the MDI container 22 and the window control program 23 generating a window independent of the operating system 40. The step numbers shown in FIG. 9 correspond to those shown in FIGS. 10 and 11.

When the virtual terminal 71 issues a request to open a new window "A" to the operating system 40, an instruction to open the new window "A" is generated and then captured by the window control program 23 which issues a cancel of the instruction to the operating system 40 (step 201). Then, the window control program 23 performs the process of opening the window "A" in the MDI container 22 under the control of the program (steps 202 through 208). When the virtual terminal 72 issues a request to open the window "A" having the same name to the operating system 40, the operating system 40 does not know the window "A" in the virtual terminal 71 under the control of the window control program 23. Therefore, the operating system 40 issues an instruction to newly open the window "A". The window control program 23 receives the instruction, and performs the process of opening the window "A" in the virtual terminal 72 under the control of the window control program 23 (steps 201 through 208).

The above-mentioned process of generating a window by the MDI container 22 and the window control program 23 independent of the operating system 40 is described below in detail by referring to the flowcharts shown in FIGS. 10 and 11.

That is, in the window generating process 200 shown in FIG. 10, when a "NewWindow" event, which is a request to generate a window to the window management function 40*a*, is generated, the window control program 23 cancels the "NewWindow" event, and obtains and normalizes the target frame name for designation of the destination window of the corresponding window (step 201).

The window control program 23 determines whether or not the name of the window designated by the target frame matches its own window name (step 202). If they do not match, it searches the subordinate window collection (a set of window properties 30 sharing the virtual terminal management number 31) managed for each virtual terminal (step 203) and determines whether or not a window having the designated window name exists (step 204). If there is no window having the designated name, then a new window is generated, the window name and the reference to the source window are set in the window property 30 of the MDI container 22 having the window, a Navigate event (that is, a request to transfer to the resource identified by a universal resource locator (URL) or the file identified by a full path) is generated in the generated window (step 205), and then "BeforeNavigate2" event (to be generated when a transfer to a different URL is performed) is generated (step 208).

If the designated name matches the window name of the program, a Navigate event is generated in the program (in its own window) (step 206), and a "BeforeNavigate2" event is generated (step 208).

If the window having the generated name exists in step S204, the Navigate event is generated in the designated window (step 207), and the "BeforeNavigate2" event is generated (step 208).

In the preprocess 300 for navigation for processing the "BeforeNavigate2" event shown in FIG. 11, it is first determined whether or not a document object designated by the URL exists (step 301). If it exists, it is determined whether or not the window name exists in its own window (step 302). If it does not exist, then its own window name is obtained from the window property 30 and set (step 304).

If there is reference (parent window pointer 34 for internal management) to the source set in the MDI container 22, it is determined whether or not there is its parent (window.opener) (step 303), and if there is no parent, then the source is obtained from the MDI container 22 and its parent (window.opener) is set in the parent window pointer 34 for internal management (step 305). The process in step 305 is performed for management of the parent-child set of windows by the window control program 23 independent of the operating system 40.

Thus, as shown in FIG. 3, the corresponding window in the MDI container (22) and the windows A and B are sequentially defined as parent-child sets, and the windows A and B are displayed on the virtual terminals 71 and 72.

As described above, after the load test of the measurement target server environment 50 in step 106 using a plurality of virtual terminals 71 and 72 generated in the MDI container 22 of the simulator 21, the performance data 26a recorded during the test by the simulator 21 is analyzed by the analyzer 26, represented as the information, table, or graph of the throughput, etc. indicating the number of processes of transactions per unit time, displayed on the display 14, and provided for a performance evaluating operation, etc. of the measurement target server environment 50 by the user 80 (step 107).

As explained above, according to the present embodiment, a plurality of virtual terminals are generated in the MDI container 22 for providing an execution environment of an application program in the MDI system, and a browser is activated in each conventional technology, thereby generating a number of virtual terminals without wasting the resources such as the memory capacity, etc. of the main storage 12.

Furthermore, independent of the window management by the operating system 40, the generation of a window of each application program in the MDI container 22 is managed by the window control program 23 and the window property 30. Therefore, a window which cannot be generated due to a duplicate window name in the management of the operating system 40 can be independently displayed in the MDI container 22, and a terminal emulation close to an actual terminal can be realized by the virtual terminal in the MDI container 22.

As a result, a plurality of virtual terminals are generated in the MDI container 22, a browser is activated in each virtual terminal to access the WWW server 51, etc. of the measurement target server environment 50, and a load test is conducted on the WWW server 51 by the emulation close to the actual operation state of a browser with high reliability of the load test.

Since each virtual terminal is connected to the information network 60 through the common network interface 16, a high reliability load test of a network device of the measurement target server environment 50, etc. can be conducted at a lower cost with less resources and a current use environment without complicated preliminary operations such as a duplicate address check, etc. of a MAC address, etc. in the information network 60.

According to the present invention, a plurality of virtual terminals can be realized without increasing the consumption of resources or without interference with the independence of display information of a generated window.

Also according to the present invention, a high reliability load test of a network device of the measurement target server environment 50, etc. can be conducted at a lower cost with less resources and a current use environment without complicated preliminary operations such as a duplicate address check, etc. in an information network.

What is claimed is:

1. A non-transitory computer-readable storage medium storing a terminal emulation program for load test of network device, and used to direct a computer to realize:

generating a plurality of virtual terminals in a multiple document interface (MDI) container of a computer wherein, in said computer, an operating system having a window management function is implemented;

activating WEB browsers in each said plurality of virtual terminals by an MDI system;

executing said WEB browsers to access said network device;

issuing, by at least one WEB browser of said WEB browsers in each of said plurality of said virtual terminals, a request to open a window of said WEB browser to said operating system;

capturing, by said window management function, a command issued from said operating system to open said window of said WEB browser related to said request;

issuing, by said window management function, a cancellation of said command to open said window of said WEB browser issued by said operating system; and performing, by said window management function, a process of opening said window of said WEB browser in one of said plurality of virtual terminals generated in said MDI container under a control of said window management function, said opened window having a window named, independently from said operating system, wherein in said performing, a window property table stored in a storage unit is used to perform said process of opening said window of said WEB browser in each of said plurality of said virtual terminals in said MDI container said window property table at least including a virtual terminal management number for identification of the window as to which it belongs in a plurality of virtual terminals generated by the MDI container, a window management number in a virtual terminal for management of the window in each virtual terminal, a window name for internal management storing the name of the window for management of a window independent of the operating system and a parent window pointer for internal management indicating from which window the window has been opened.

2. A load test method of network device, comprising:

generating a plurality of virtual terminals in a computer providing an execution environment in a multiple document interface (MDI) container, wherein, in said computer, an operating system having a window management function is implemented;

activating WEB browsers in each of the plurality of virtual terminals by an MDI system;

executing said WEB browsers to access said network device;

issuing, by at least one WEB browser of said WEB browsers in each of said plurality of said virtual terminals, a request to open a window of said WEB browser to said operating system;

capturing, by said window management function, a command issued from said operating system to open said window of said WEB browser related to said request;

issuing, by said window management function, a cancellation of said command to open said window of said WEB browser issued by said operating system; and performing, by said window management function, a process of opening said window of said WEB browser in one of said plurality of virtual terminals generated in said MDI container under a control of said window management function, said opened window having a window named, independently from said operating system, wherein in said performing, a window property table stored in a storage unit is used to perform said process of opening said window of said WEB browser in each of said plurality of said virtual terminals in said MDI container, said window property table at least including a virtual terminal management number for identification of the window as to which it belongs in a plurality of virtual terminals generated by the MDI container, a window management number in a virtual terminal for management of the window in each virtual terminal, a window name for internal management storing the name of the window for management of a window independent of the operating system and a parent window pointer for internal management indicating from which window the window has been opened.

3. The method according to claim 2, further comprising:

recording at least an access history information by an actual physical terminal to the network device; wherein the executing executes WEB browsers to access the network device according to the recorded access history information.

4. The method according to claim 2, wherein an operation log recording an access progress from an actual terminal to the network device is collected, and access to the network device from each of the plurality of virtual terminals is controlled based on the operation log, thereby conducting the load test.

5. A non-transitory computer-readable storage medium storing a terminal emulation program for load test of network device, and used to direct a computer to realize:

generating a plurality of virtual terminals in a computer wherein, in said computer, an operating system having a window management function is implemented and which is connected to a network device to be tested over an information network;

activating WEB browsers in each of the plurality of virtual terminals by a multiple document interface (MDI) system;

executing said WEB browsers to access said network device;

issuing, by at least one WEB browser of said WEB browsers in each of said plurality of said virtual terminals, a request to open a window of said WEB browser to said operating system;

capturing, by said window management function, a command issued from said operating system to open said window of said WEB browser related to said request;

issuing, by said window management function, a cancellation of said command to open said window of said WEB browser issued by said operating system; and performing, by said window management function, a process of opening said window of said WEB browser in one of said plurality of virtual terminals generated in said MDI container under a control of said window management function, said opened window having a window named, independently from said operating system, wherein in said performing, a window property table stored in a storage unit is used to perform said process of opening said window of said WEB browser in each of said plurality of said virtual terminals in said MDI container, said window property table at least including a virtual terminal management number for identification of the window as to which it belongs in a plurality of virtual terminals generated by the MDI container, a window management number in a virtual terminal for management of the window in each virtual terminal, a window name for internal management storing the name of the window for management of a window independent of the operating system and a parent window pointer for internal management indicating from which window the window has been opened.

\* \* \* \* \*